US008276569B2

(12) United States Patent
Kosugi

(10) Patent No.: US 8,276,569 B2
(45) Date of Patent: Oct. 2, 2012

(54) FUEL VAPOR PROCESSING APPARATUS

(75) Inventor: Ryuji Kosugi, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 366 days.

(21) Appl. No.: 12/688,036

(22) Filed: Jan. 15, 2010

(65) Prior Publication Data

US 2010/0180870 A1 Jul. 22, 2010

(30) Foreign Application Priority Data

Jan. 20, 2009 (JP) ................................ 2009-009730

(51) Int. Cl.
*F02M 33/02* (2006.01)
*B01D 53/02* (2006.01)

(52) U.S. Cl. ............................ 123/519; 96/139; 96/152

(58) Field of Classification Search .................. 123/516, 123/518, 519, 520; 96/131, 139, 152
See application file for complete search history.

(56) References Cited

U.S. PATENT DOCUMENTS

| | | | | |
|---|---|---|---|---|
| 5,599,384 | A * | 2/1997 | Yoshida et al. | 96/143 |
| 6,273,070 | B1 * | 8/2001 | Arnal et al. | 123/519 |
| 6,935,318 | B2 * | 8/2005 | Abidi et al. | 123/519 |
| 7,134,426 | B2 * | 11/2006 | Uchino et al. | 123/518 |
| 7,281,525 | B2 * | 10/2007 | Shears et al. | 123/518 |
| 7,322,343 | B2 * | 1/2008 | Yamada et al. | 123/519 |
| 7,895,991 | B2 * | 3/2011 | Lin et al. | 123/519 |

FOREIGN PATENT DOCUMENTS

| | | |
|---|---|---|
| JP | 11023172 | 1/1999 |
| JP | 2008202604 | 9/2008 |

* cited by examiner

*Primary Examiner* — Thomas Moulis

(74) *Attorney, Agent, or Firm* — Dennison, Schultz & MacDonald

(57) ABSTRACT

One aspect according to the present invention includes a fuel vapor processing apparatus including an insert. The insert can determine an effective flow passage area of the adsorption material chamber without producing a non-filled region of an adsorption material, through which fuel vapor containing gas flows.

17 Claims, 5 Drawing Sheets

FUEL VAPOR PROCESSING APPARATUS

This application claims priority to Japanese patent application serial number 2009-009730, the contents of which are incorporated herein by reference.

BACKGROUND OF THE INVENTION

1. Field of the Invention

The present invention relates to fuel vapor processing apparatus that can be installed on vehicles.

2. Description of the Related Art

Japanese Laid-Open Patent Publication No. 2008-202604 discloses a known fuel vapor processing apparatus. As shown in FIG. 10, the know fuel vapor processing apparatus disclosed in this publication includes a casing 120 with a tank port (charge port) 121, a purge port 122 and an atmospheric port 123. An inner space of the casing 120 is divided into a first adsorption material chamber 124 and a second adsorption material chamber 125 that communicate with each other via a communication passage 126. An adsorption material cartridge 132 is fitted into an end portion of the second adsorption material chamber 125 on the side of the atmospheric port 123. Activated carbon 131 is filled into the first adsorption material chamber 124 and the second adsorption material chamber 125 including the adsorption material cartridge 132. A non-filled space R having no adsorption material filled therein is defined between an outer peripheral surface of the adsorption material cartridge 132 and the inner peripheral surface of the casing 120 opposed thereto. The tank port 121 is connected to a fuel tank, the purge port 122 is connected to an intake manifold of an engine, and the atmospheric port 123 communicates with the atmosphere.

For example, when the engine is stopped, a fuel vapor containing air produced within the fuel tank is introduced into the casing 120 via the tank port 121, so that fuel vapor (HC gas) can be adsorbed by the activated carbon 131. After adsorption of the fuel vapor by the activated carbon 131, air is discharge into the atmosphere via the atmospheric port 123. During the operation of the engine, the fuel vapor adsorbed by the activated carbon 131 is desorbed and discharged to the intake side of the engine (i.e., the intake manifold) from the purge port 122. At the same time, air is introduced into the casing 120 via the atmospheric port 123. Exchanging the adsorption material cartridge 132 fitted into the end portion of the second adsorption chamber 125 on the side of the atmospheric port 123 to another cartridge can change an L/D ratio. Here, "L" designates a length of an activated carbon layer (adsorption material layer) within the adsorption material cartridge 132, and "D" designates a diameter (effective diameter) of a circular area that is equivalent to the cross sectional area of the activated carbon layer within the adsorption material cartridge 132.

The following is the reason as to why the L/D ratio is varied by exchanging the adsorption material cartridge 132 to another one. For example, if the L/D ratio is increased by varying the diameter D with the length L set to a fixed value, the resistance against flow of air may increase, while the residual amount of the fuel vapor after being purged may decrease, so that adsorption and adsorption abilities may be improved. On the other hand, if the L/D ratio is decreased, the resistance against flow of air may decrease, while the residual amount of the fuel vapor after being purged may increase, so that adsorption and adsorption abilities may be lowered. Therefore, it is necessary to set the L/D ratio to a value required for the fuel vapor processing apparatus 100, which value depends on the type of vehicle on which the apparatus 100 is installed. However, if different types of casings 120 are prepared for different uses, the manufacturing cost may increase. Therefore, different types of adsorption material cartridges are prepared for use in exchange for providing different L/D ratios, so that the casing 120 can be commonly used to save manufacturing cost.

According to the configuration of the known fuel vapor processing apparatus 100, although the activated carbon 131 is filled into the adsorption material cartridge 132, the non-filled space R having no adsorption material filled therein is defined between the outer peripheral surface of the adsorption material cartridge 132 and the inner peripheral surface of the casing 120. Therefore, a "blow-through" phenomenon may be caused to allow fuel vapor containing gas to be discharged to the atmosphere from the atmospheric port 123 though the non-filled space R without flowing through the activated carbon layer of the adsorption material cartridge 132. In order to prevent this "blow-through" phenomenon, a gasket 140 or the like is required between the second adsorption material chamber 125 of the casing 120 and the adsorption material cartridge 132 for sealing the non-filled space R. This leads to increase in the number of parts and the number of assembling steps of the apparatus, resulting in increase of manufacturing costs. In addition, a problem may exist that the gasket 140 or the like may be damaged or deformed during its assembling step or may be degraded during the long time use to cause leakage therefrom.

Therefore, there is a need in the art for fuel vapor processing apparatus that is designed for setting an L/D ratio and can prevent a "blow-through" phenomenon without need of a seal member.

SUMMARY OF THE INVENTION

One aspect according to the present invention includes a fuel vapor processing apparatus including an insert. The insert can set an effective flow passage area of the adsorption material chamber without producing a non-filled region of an adsorption material, through which fuel vapor containing gas flows.

DETAILED DESCRIPTION OF THE INVENTION

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a fuel vapor processing apparatus includes a case defining an adsorption material chamber, through which fuel vapor containing gas can flow. An adsorption material is filled within the adsorption material chamber. An L/D ratio setting region is defined in the adsorption material chamber. Here, "L" designates a length of the L/D ratio setting region along a direction of flow of fuel vapor containing gas and "D" designates a diameter of a circular area equivalent to a cross sectional area of the L/D ratio setting region substantially perpendicular to the direction of flow of fuel vapor containing gas. An L/D ratio setting device has an L/D ratio setting member disposed within the L/D ratio setting region so as to be surrounded by the adsorption material. The L/D ratio setting member can restrict a filling volume of the adsorption material.

With this arrangement, within the L/D ratio setting region, there exists no space through which fuel vapor containing gas is blown. Therefore, it is possible to prevent a blow-through phenomenon of fuel vapor containing gas without use of a seal member. In addition, changing the size or configuration of the L/D setting member can vary the L/D ratio.

Various embodiments of the present invention will now be described with reference to the drawings.

<First Embodiment>

Figure 1:
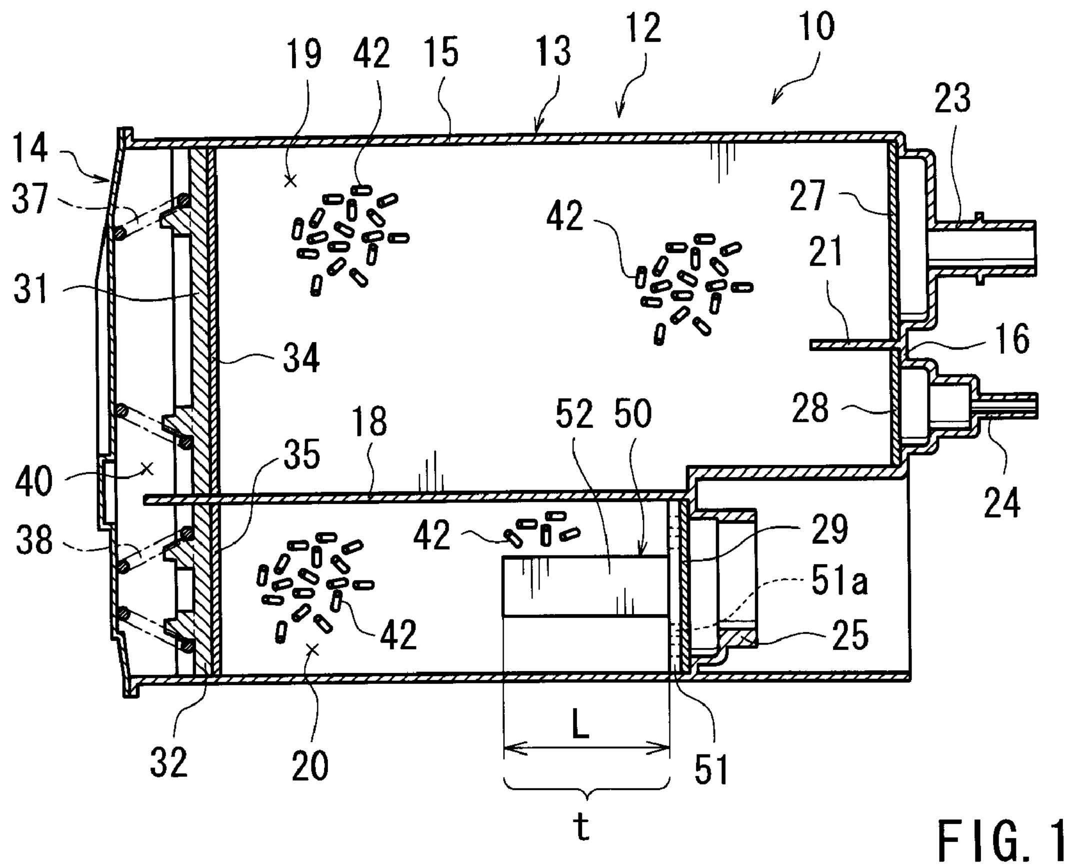
FIG. 1 is a horizontal sectional view of a fuel vapor processing apparatus according to a first embodiment of the present invention.

A first embodiment of the present invention will now be described with reference to FIGS. 1 to 3. This embodiment relates to a fuel vapor processing apparatus that is designed for installation on vehicles, such as a motor vehicle. In FIG. 1, a fuel vapor processing apparatus 10 is shown in a horizontal sectional view. In the following description, the terms "left side" and "right side" are used to mean the left side and the right side as viewed in FIG. 1. The terms "front side" and "rear side" are used to mean the lower side and the upper side, respectively, as viewed in FIG. 1.

Referring to FIG. 1, the fuel vapor processing apparatus 10 includes a case 12 made of resin. The case 12 is constituted by a bottomed polygonal tubular case body 13 and a cover plate 14 that is positioned to close an opening of the case body 13. The case body 13 includes a polygonal tubular circumferential wall 15 and an end wall 16 formed integrally with each other. The circumferential wall 15 has a right open end and a left open end. The end wall 16 closes the right open end of the circumferential wall 15. The cross sectional area of the inner space of the circumferential wall 15 gradually increases from the side of the end wall 16 (right side in FIG. 1) toward the left open end.

The inner space of the case body 13 is divided into a first adsorption material chamber 19 and a second adsorption material chamber 20 by a partition wall 18 that extends leftward from the inner surface of the end wall 16. With respect to the inner space of the case body 13, the first adsorption material chamber 19 is positioned on the rear side (upper side in FIG. 1) and the second adsorption material chamber 20 is positioned on the front side (lower side in FIG. 1). The right end portion of the first adsorption material chamber 19 is further divided into a front sub-chamber and a rear sub-chamber by a partition wall 21 extending leftward from the inner surface of the end wall 16. A tank port 23, a purge port 24 and an atmospheric port 25 are formed with the outer side surface of the end wall 16 and are arranged in this order from the rear side (upper side in FIG. 1) toward the front side (lower side in FIG. 1). The rear sub-chamber of the first adsorption material chamber 19 communicates with the outside via the tank port 25. The front sub-chamber of the first adsorption material chamber 19 communicates with the outside via the purge port 24. The second adsorption material chamber 20 communicates with the outside via the atmospheric port 25.

Within the rear sub-chamber of the first adsorption material chamber 19, a filter 27 is attached to the inner surface of the end wall 16 so as to be opposed to a communication opening on the side of the base portion of the tank port 23. On the other hand, within the front sub-chamber of the first adsorption material chamber 19, a filter 28 is attached to the inner surface of the end wall 16 so as to be opposed to a communication opening on the side of the base portion of the purge port 24. Further, within the second adsorption material chamber 20, a filter 29 is attached to the inner surface of the end wall 16 so as to be opposed to a communication opening on the side of the base portion of the atmospheric port 25. Each of the filters 27, 28 and 29 is formed of an air permeable sheet.

Perforated plates 31 and 32 are positioned within the open end portions of the first and second adsorption material chambers 19 and 20, respectively, and can slidably move in left and right directions. Filters 34 and 35 each formed of a gas permeable sheet are overlapped with the right surfaces of the perforated plates 31 and 32 on the side of the adsorption material chambers 19 and 20, respectively. Springs 37 and 38 are disposed between the perforated plate 31 and the cover plate 14 and between the perforated plate 32 and the cover plate 14, respectively, so that the perforated plates 31 and 32 are resiliently biased toward the inside of the first and second adsorption material chambers 19 and 20, respectively. A space between the cover plate 14 and the perorated plate 31 and a space between the cover plate 14 and the perforated plate 32 communicate with each other via a clearance provided between the cover plate 14 and the left end of the partition wall 18 so as to jointly define a communication passage 40. Therefore, the first adsorption material chamber 19, the communication passage 40 and the second adsorption material chamber 20 define a U-shaped curved path for the flow of fuel vapor containing gas within the case 12. In this embodiment, the flow passage area (i.e., a cross sectional area perpendicular to the direction of flow of fuel vapor containing gas) of the second adsorption material chamber 20 is set to be substantially half the flow passage area of the first adsorption material chamber 19.

An adsorption material 42 capable of adsorbing fuel vapor is filled in a layered manner within the first adsorption material chamber 19 (more specifically, between the filter 34 and the filters 27 and 28) and also within the second adsorption material chamber 20 (more specifically, between the filter 35 and the filter 29). In this embodiment, activated carbon granules constitute the adsorption material 42. As the materials of the filters 27, 28, 29, 34 and 35, non-woven fabrics may be used. One example of the non-woven fabrics is a non-woven fabric made of a mixture of polyester fibers and rayon fibers.

The tank port 23 may be connected to a fuel tank of a vehicle (not shown). The purge port 24 may be connected to an intake manifold of an engine of the vehicle (not shown). The atmospheric port 25 is open into the atmosphere. For example, when the engine is stopped, fuel vapor containing gas produced within the fuel tank may be introduced into the case 12 via the tank port 23, so that fuel vapor may be adsorbed by the adsorption material 42 contained in the first adsorption material chamber 19 and also by the adsorption material 42 contained in the second adsorption material chamber 20. The fuel vapor containing gas is a mixture of air and fuel vapor that may primarily contain HC (hydrocarbon compound) gas. After the fuel vapor has been adsorbed by the adsorption material 42 within the adsorption material chambers 19 and 20, substantially only air is discharged to the atmosphere via the atmospheric port 25. On the other hand, during the operation of the engine, air may be introduced into the case 12 via the atmospheric port 25 to flow through the adsorption material 42 of the second adsorption material chamber 20 and the adsorption material 42 of the first adsorption material chamber 19 and to further flow into the intake side of the engine (i.e., the intake manifold) via the purge port 24. During the flow of the air through the adsorption material 42, the air desorbs the fuel vapor adsorbed by the adsorption material 42. Eventually, the desorbed fuel vapor carried by the air is supplied to the engine for combustion within the engine. With this desorption (purge) process, a fuel vapor adsorption ability of the adsorption material 42 contained in the first and second adsorption material chambers 19 and 20 can be recovered.

Figure 2:
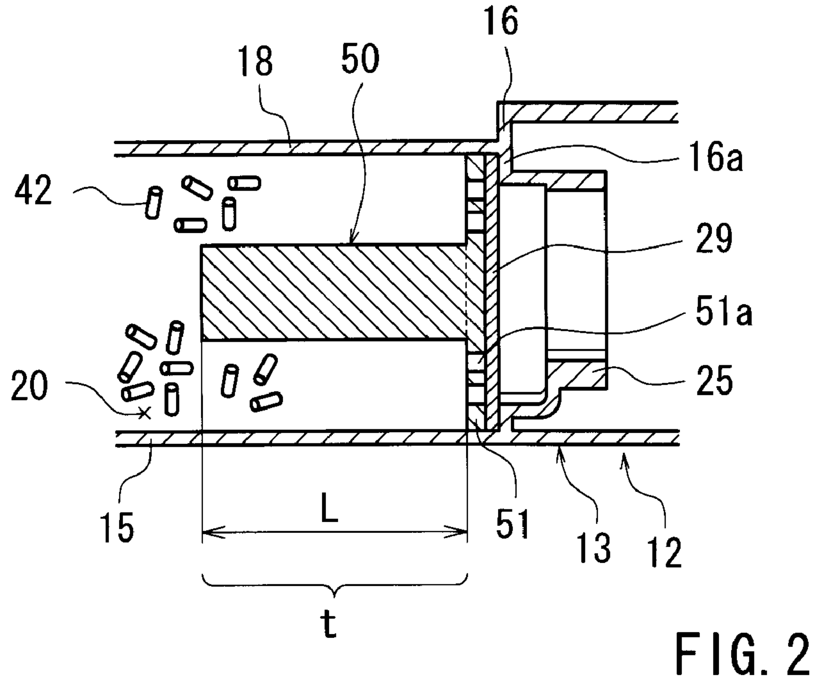
FIG. 2 is an enlarged sectional view of a portion of the fuel vapor processing apparatus.

Referring to FIG. 2, an L/D ratio setting region t is defined in the end portion of the second adsorption material chamber 20 on the side of the atmospheric port 25 (i.e., the side of the end wall 16 of the case body 13). Here, "L" designates a length of the setting region t along a direction of flow of the fuel vapor and "D" designates a diameter (effective diameter) of a circular area equivalent to the cross sectional area of the setting region t perpendicular to the direction of flow of the fuel vapor. An insert 50 is inserted into the setting region t.

Figure 3:
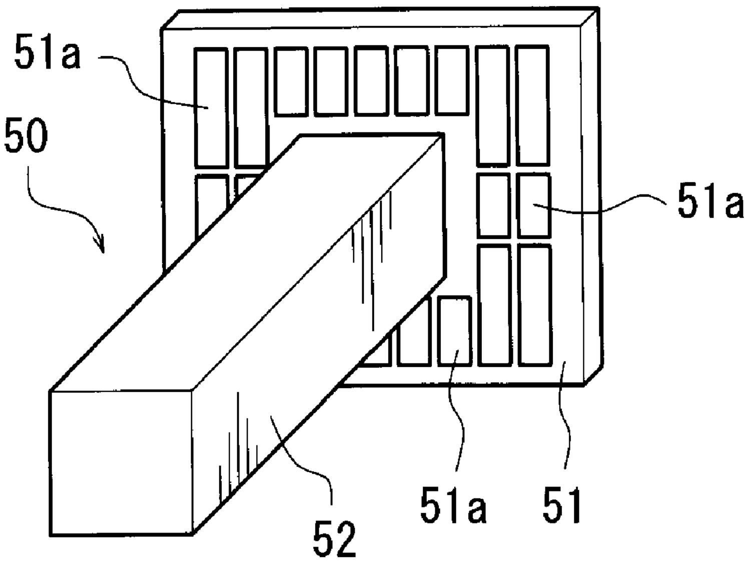
FIG. 3 is a perspective view of an insert of the fuel vapor processing apparatus.

Referring to FIG. 3, the insert 50 is made of resin and has a rectangular support plate 51 and a rectangular bar-like L/D ratio setting member 52. The L/D ratio setting member 52 extends from one side surface of the support plate 51 and has a center axis extending through the center of the support plate 51. In this embodiment, the L/D ratio setting member 52 is a solid member and has no gas passage hole. A plurality of gas passage holes 51*a* are formed in the support plate 51 except for a central region of the support plate 51, from which the L/D ratio setting member 52 extends. Therefore, the support plate 51 allows gas to flow though the gas passage holes 51*a*. As shown in FIG. 2, the support plate 51 can be fitted into the end portion of the second adsorption material chamber 20 on the side of the end wall 16.

Practically, the insert 50 is inserted into the second adsorption material chamber 20 prior to filling the adsorption material 42 into the second adsorption material chamber 20. Because the filter 29 is previously inserted into the end portion of the second adsorption material chamber 20 on the side of the end wall 16, the support plate 51 is fitted into the end portion of the second adsorption material chamber 20 so as to be overlapped with the filter 29. More specifically, the outer peripheral portion of the support plate 51 is supported by a stepped portion 16*a* defining a base end side opening of the atmospheric port 25, via the filter 29. Fitting the support plate 51 in this way leads to position the L/D ratio setting member 52 to extend along the direction of flow of fuel vapor containing gas (left and right directions in FIG. 2) at the central region within the end portion of the second adsorption material chamber 20 on the side of the end wall 16. Thereafter, the adsorption material 42 is filled into the second adsorption material chamber 20, so that the L/D ratio setting member 52 is surrounded by the adsorption material 42 and can be prevented from being removed from the second adsorption material chamber 20. In order to facilitate the operations for inserting the insert 50 and filling the adsorption material 42, the case body 13 may be positioned such that its open side is oriented vertically upward.

The L/D ratio setting member 52 defines a non-filled region of the adsorption material 42 within the setting region t and serves to set the L/D ratio of the setting region t. The length of the L/D ratio setting member 52 and the cross sectional area perpendicular to the central axis of the L/D ratio setting member 52 are set to correspond to a desired L/D ratio of the setting region t, which is suited to the fuel vapor processing apparatus 10 that may be used for a specific type of vehicle. Although the L/D ratio setting member 52 has a rectangular bar-like configuration in this embodiment, the L/D ratio setting member 52 may have any other configuration, such as a polygonal bar-like configuration, other than a triangular bar-like configuration. In addition, the central axis of the L/D ratio setting member 52 may be offset from the center of the support plate 51.

According to the fuel vapor processing apparatus 10 described above, there exists no space within the setting region t, which may cause a blow-through phenomenon of fuel vapor containing gas. Therefore, it is possible to prevent the blow-through phenomenon without need of a seal member for sealing such a space. Hence, it is possible to reduce the number of parts and the number of assembling steps and to reduce the manufacturing cost. In addition, it is also possible to resolve problems, which may be accompanied by the incorporation of the sealing member, such as leakage from the seal member due to damage or deformation of the seal member or due to long time use of the seal member. In addition, the L/D ratio of the setting region t can be suitably set by suitably setting the size of the L/D ratio setting member 52 of the insert 50 or by replacing the insert 50 with another cartridge having a different L/D ratio setting member that can provide a suitable L/D ratio. In this way, the L/D ratio can be changed without causing a blow-through phenomenon of fuel vapor containing gas and without need of a seal member.

Further, the adsorption material 42 can closely contact with the entire inner circumferential wall of the second adsorption material chamber 20, i.e., the circumferential wall 15 and the partition wall 18 of the case body 13 of the case 12 defining the second adsorption material chamber 20. Therefore, abilities of transmission of heat (including absorption heat produced when fuel vapor is absorbed by the adsorption material 42 and desorption heat produced when fuel vapor is desorbed from the adsorption material 42) between the case 12 and the adsorption material 42 can be improved. As a result, it is possible to improve the adsorption and desorption properties of the adsorption material 42.

Second to sixth embodiments will now be described with reference to FIGS. 4 to 9. These embodiments relate to modifications of the insert 50 of the first embodiment and the other construction than the insert 50 is the same as the first embodiment. In addition, in FIGS. 4 to 9, like members are given the same reference numerals as the first embodiment and the description of these members will not be repeated.

<Second Embodiment>

Figure 4:
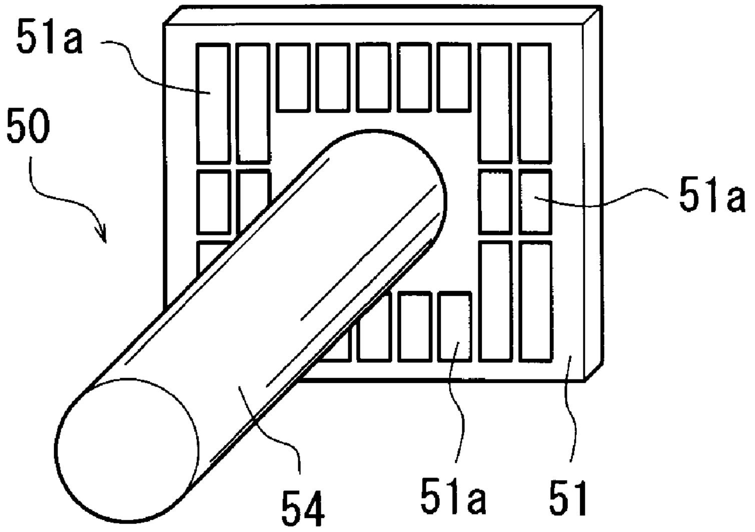
FIG. 4 is a perspective view of an insert according to a second embodiment of the present invention.

A second embodiment will now be described with reference to FIG. 4. According to this embodiment, the L/D ratio setting member 52 of the first embodiment is replaced with an L/D ratio setting member 54 having a cylindrical rod-like configuration.

<Third Embodiment>

Figure 5:
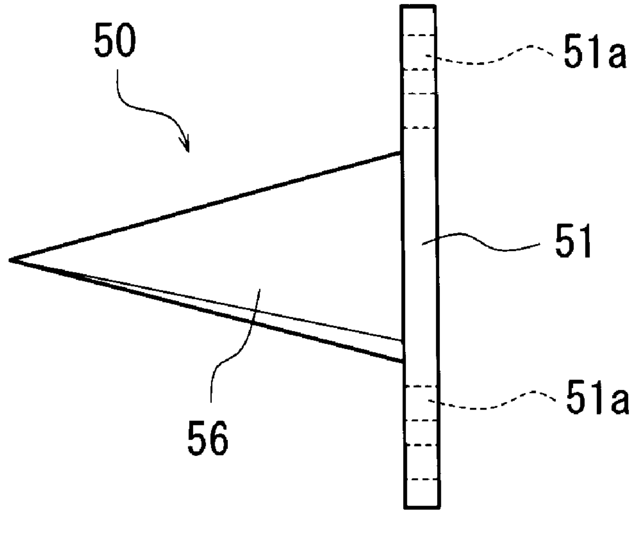
FIG. 5 is a side view of an insert according to a third embodiment of the present invention.

A third embodiment will now be described with reference to FIG. 5. According to this embodiment, the L/D ratio setting member 52 of the first embodiment is replaced with an L/D ratio setting member 56 having a pyramid-like configuration with three or more sides. Otherwise, the L/D ratio setting member 56 may have a conical configuration.

<Fourth Embodiment>

Figure 6:
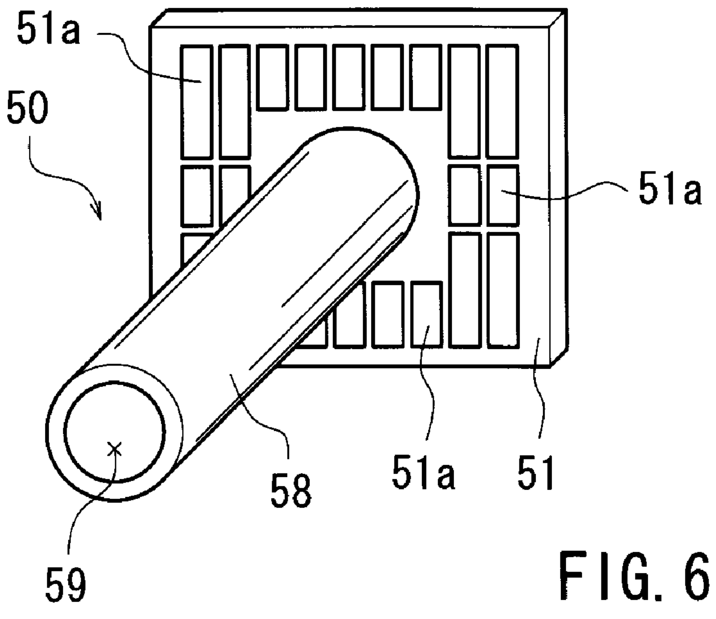
FIG. 6 is a perspective view of an insert according to a fourth embodiment of the present invention.
Figure 7:
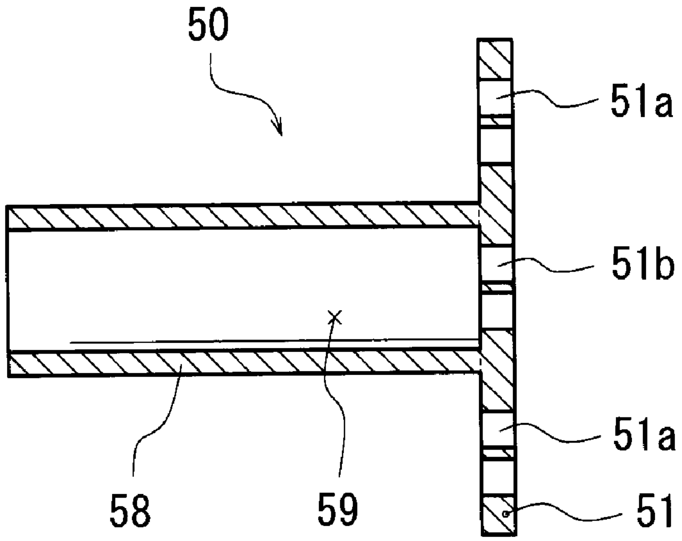
FIG. 7 is a cross sectional view of the insert shown in FIG. 6.

A fourth embodiment of the present invention will now be described with reference to FIGS. 6 and 7. This embodiment is a further modification of the insert 50 of the second embodiment (see FIG. 4). According to this embodiment, the L/D ratio setting member 54 is replaced with an L/D ratio setting member 58 having a cylindrical tubular configuration. In this case, the adsorption material 42 (see FIG. 3) may be filled within a hollow space 59 defined in the L/D ratio setting member 58. For this reason, a suitable number of additional gas passage holes 51*b* are formed in the support plate 51 in communication with the hollow space 59. With this arrangement, the adsorption material 42 filled within the hollow space 59 also serves to adsorb fuel vapor in the same manner as the adsorption material 42 positioned on the outer side of the L/D ratio setting member 58.

<Fifth Embodiment>

Figure 8:
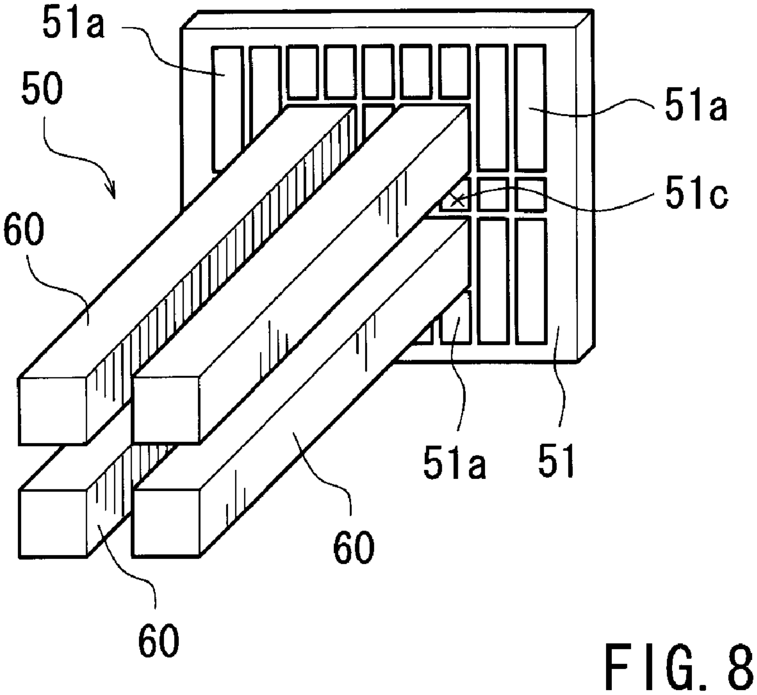
FIG. 8 is a perspective view of an insert according to a fifth embodiment of the present invention.

A fifth embodiment of the present invention will now be described with reference to FIG. 8. According to this embodiment, the L/D ratio setting member 52 of the insert 50 of the first embodiment is replaced with a plurality of L/D ratio setting members 60 each having a rectangular bar-like configuration. In this embodiment, four L/D ratio setting members 60 are provided. According to this arrangement, the adsorption material 42 may be filled into a space defined between the L/D ratio setting members 60. In this connection, additional gas passage holes 51*c* are formed in the support plate 51 at suitable positions between the L/D ratio setting members 60. With this arrangement, the adsorption material 42 positioned between the L/D ratio setting members 60 also serves to adsorb fuel vapor in the same manner as the adsorption material 42 positioned on the outer circumferential side of the region of the L/D ratio setting members 60. Although not shown in the drawings, the L/D ratio setting member 54 of the second embodiment and the L/D ratio setting member 56 of the third embodiment may be each provided in plural numbers in the same manner as the fifth embodiment.

<Sixth Embodiment>

Figure 9:
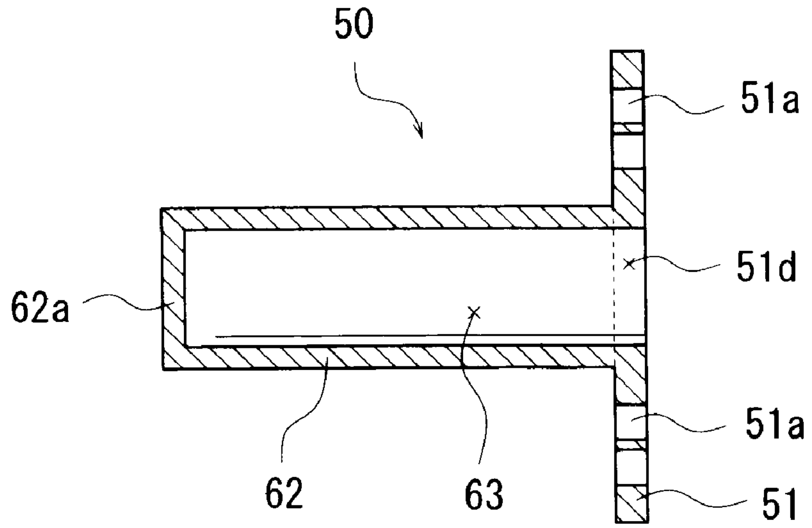
FIG. 9 is a cross sectional view of an insert according to a sixth embodiment of the present invention.
Figure 10:
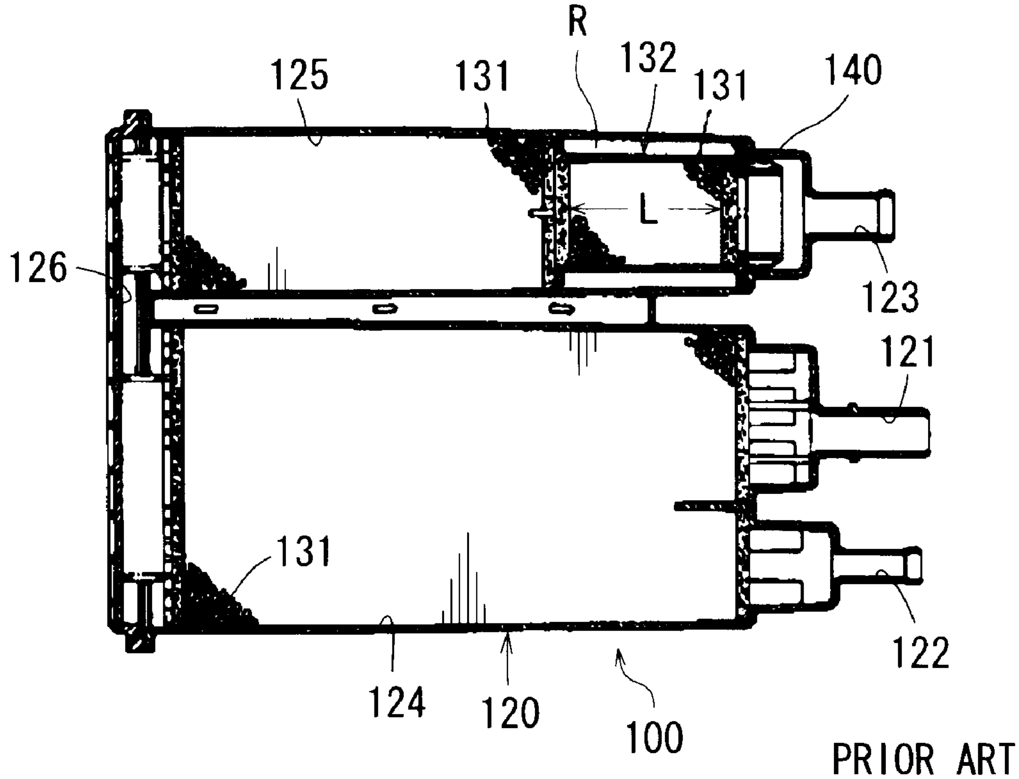
PRIOR ART FIG. 10
FIG. 10 is a cross sectional view of a known fuel vapor processing apparatus.

A sixth embodiment of the present invention will now be described with reference to FIG. 9. According to this embodiment, the L/D ratio setting member 52 of the insert 50 of the first embodiment is replaced with a tubular L/D ratio setting member 62 having one end (left end as viewed in FIG. 9) closed by an end plate 62*a*. The L/D ratio setting member 62 may have a cylindrical tubular configuration or a polygonal tubular configuration. In this case, it is only necessary for the L/D ratio setting member 62 that its outer wall opposing to the adsorption material 42 (see FIG. 3) has no gas passage hole. Therefore, a hollow space 63 defined in the L/D ratio setting member 62 may be opened to communicate with the atmospheric port 25 via an opening 51*d* formed in the support plate 51. Otherwise, the support plate 51 may close the hollow space 63. Although not shown in the drawings, the L/D ratio setting member 54 of the second embodiment and the L/D ratio setting member 56 of the third embodiment may be each formed to have a hollow space in the same manner as the sixth embodiment.

<Other Possible Modifications>

The present invention may not be limited to the above embodiments but may be modified further in various ways. For example, although fuel vapor containing gas flows along a U-shaped curved path in the fuel vapor processing apparatus 10 of the above embodiment, the fuel vapor processing apparatus 10 may be configured such that fuel vapor containing gas can flow along a straight path. The number, configuration and positional relationship with the adsorption material chamber of the L/D ratio setting member can be suitable determined. It is only necessary for the L/D ratio setting member that the L/D ratio setting member is positioned within the L/D ratio setting region t so as to be surrounded by the adsorption material 42 and that the L/D ratio setting member does not allow gas to flow therethrough in order to restrict the filling space of the adsorption material 42. In addition, the support plate 51 may not be limited to have a configuration of a perforated plate but may have any other configurations, such as a configuration like a crossbar or a fin. Further, although the support member (support plate) and the L/D ratio setting member(s) are formed integrally with each other to form the insert, the support member and the L/D ratio setting member(s) may be formed as separate members from each other. In such a case, the L/D ratio setting member(s) may be mounted to the support member, so that the L/D ratio setting member(s) can be supported on the case 12 via the support member. In the case of this arrangement, the support member may be formed integrally with the case body 13.

The invention claims:

1. A fuel vapor processing apparatus comprising:

a case defining an adsorption material chamber, through which fuel vapor containing gas can flow;

an adsorption material filled within the adsorption material chamber;

an L/D ratio setting region defined in the adsorption material chamber;

wherein "L" designates a length of the L/D ratio setting region along a direction of flow of fuel vapor containing gas and "D" designates a diameter of a circular area equivalent to a cross sectional area of the L/D ratio setting region substantially perpendicular to the direction of flow of fuel vapor containing gas; and an L/D ratio setting device including an L/D ratio setting member disposed within the L/D ratio setting region so as to be surrounded by the adsorption material and capable of restricting a filling volume of the adsorption material, wherein:

the case includes a tank port communicating with a fuel tank, a purge port communicating with an engine, and an atmospheric port communicating with the atmosphere, during an adsorption operation, fuel vapor containing gas generated within the fuel tank is introduced into the adsorption chamber via the tank port and flows through the adsorption chamber toward the atmospheric port, so that fuel vapor contained in the fuel vapor containing gas is adsorbed by the adsorption material;

during a desorption operation, atmospheric air is introduced into the adsorption chamber via the atmospheric port and flows through the adsorption chamber toward the purge port, so that fuel vapor is desorbed from the adsorption material and is supplied to the engine via the purge port;

the adsorption chamber includes an end portion facing to the atmospheric port;

the L/D ratio setting region is defined at a downstream end portion of the adsorption material chamber with respect to the direction of flow of fuel vapor containing gas;

the L/D ratio setting member includes an upstream end and a downstream end with respect to the direction of flow of fuel vapor containing gas, and an outer circumferential surface extending between the upstream end and the downstream end; and at least the upstream end and the outer circumferential surface have no gas communication hole.

2. The fuel vapor processing apparatus as in claim 1, wherein the L/D ratio setting device further includes a support member for supporting the L/D ratio setting member within the L/D ratio setting region.

3. The fuel vapor processing apparatus as in claim 2, wherein:

the support member is positioned at the downstream end of the L/D ratio setting region; and the L/D ratio setting member extends from the support member toward the upstream end of the L/D ratio setting region.

4. The fuel vapor processing apparatus as in claim 3, wherein the support member includes a plurality of gas passage holes allowing gas to flow therethrough from the upstream side to the downstream side of the support member.

5. The fuel vapor processing apparatus as in claim 3, wherein the L/D ratio setting member has a longitudinal axis substantially parallel to the direction of flow of fuel vapor containing gas.

6. A fuel vapor processing apparatus comprising:

a case defining an adsorption material chamber, through which fuel vapor containing gas can flow;

an adsorption material filled within the adsorption material chamber;

an L/D ratio setting region defined in the adsorption material chamber;

wherein "L" designates a length of the L/D ratio setting region along a direction of flow of fuel vapor containing gas and "D" designates a diameter of a circular area equivalent to a cross sectional area of the L/D ratio setting region substantially perpendicular to the direction of flow of fuel vapor containing gas; and an L/D ratio setting device including an L/D ratio setting member disposed within the L/D ratio setting region so as to be surrounded by the adsorption material and capable of restricting a filling volume of the adsorption material;

wherein the L/D ratio setting device further includes a support member for supporting the L/D ratio setting member within the L/D ratio setting region;

the L/D ratio setting region is defined at a downstream end portion of the adsorption material chamber with respect to the direction of flow of fuel vapor containing gas and has an upstream end and a downstream end along the direction of flow of fuel vapor containing gas;

the support member is positioned at the downstream end of the L/D ratio setting region;

the L/D ratio setting member extends from the support member toward the upstream end of the L/D ratio setting region;

the L/D ratio setting member has a longitudinal axis substantially parallel to the direction of flow of fuel vapor containing gas; and the L/D ratio setting member has a solid bar shape.

7. The fuel vapor processing apparatus as in claim 6, wherein the L/D ratio setting member has a rectangular solid bar shape.

8. The fuel vapor processing apparatus as in claim 6, wherein the L/D ratio setting member has a cylindrical solid bar shape.

9. A fuel vapor processing apparatus comprising:

a case defining an adsorption material chamber, through which fuel vapor containing gas can flow;

an adsorption material filled within the adsorption material chamber;

an L/D ratio setting region defined in the adsorption material chamber;

wherein "L" designates a length of the L/D ratio setting region along a direction of flow of fuel vapor containing gas and "D" designates a diameter of a circular area equivalent to a cross sectional area of the L/D ratio setting region substantially perpendicular to the direction of flow of fuel vapor containing gas; and an L/D ratio setting device including an L/D ratio setting member disposed within the L/D ratio setting region so as to be surrounded by the adsorption material and capable of restricting a filling volume of the adsorption material;

wherein the L/D ratio setting device further includes a support member for supporting the L/D ratio setting member within the L/D ratio setting region;

the L/D ratio setting region is defined at a downstream end portion of the adsorption material chamber with respect to the direction of flow of fuel vapor containing gas and has an upstream end and a downstream end along the direction of flow of fuel vapor containing gas;

the support member is positioned at the downstream end of the L/D ratio setting region;

the L/D ratio setting member extends from the support member toward the upstream end of the L/D ratio setting region;

the L/D ratio setting member has a longitudinal axis substantially parallel to the direction of flow of fuel vapor containing gas; and the L/D ratio setting member has a solid pyramid shape.

10. A fuel vapor processing apparatus comprising:

a case defining an adsorption material chamber, through which fuel vapor containing gas can flow;

an adsorption material filled within the adsorption material chamber;

an L/D ratio setting region defined in the adsorption material chamber;

wherein "L" designates a length of the L/D ratio setting region along a direction of flow of fuel vapor containing gas and "D" designates a diameter of a circular area equivalent to a cross sectional area of the L/D ratio setting region substantially perpendicular to the direction of flow of fuel vapor containing gas; and an L/D ratio setting device including an L/D ratio setting member disposed within the L/D ratio setting region so as to be surrounded by the adsorption material and capable of restricting a filling volume of the adsorption material;

wherein the L/D ratio setting device further includes a support member for supporting the L/D ratio setting member within the L/D ratio setting region;

the L/D ratio setting region is defined at a downstream end portion of the adsorption material chamber with respect to the direction of flow of fuel vapor containing gas and has an upstream end and a downstream end along the direction of flow of fuel vapor containing gas;

the support member is positioned at the downstream end of the L/D ratio setting region;

the L/D ratio setting member extends from the support member toward the upstream end of the L/D ratio setting region;

the L/D ratio setting member has a longitudinal axis substantially parallel to the direction of flow of fuel vapor containing gas; and the L/D ratio setting member has a solid cone shape.

11. The fuel vapor processing apparatus as in claim 5, wherein the L/D ratio setting member has a hollow tubular shape defining an internal space therein.

12. The fuel vapor processing apparatus as in claim 11, wherein:

no adsorption material can be filled into the hollow space of the L/D ratio setting member.

13. The fuel vapor processing apparatus as in claim 5, wherein the L/D ratio setting member comprises a plurality of L/D ratio setting members extending substantially parallel to each other.

14. The fuel vapor processing apparatus as in claim 1, the L/D ratio setting device comprises a plurality of L/D ratio setting devices capable of providing different L/D ratios from each other and capable of being selectively detachably mounted within the case.

15. A fuel vapor processing apparatus comprising:

a case defining an adsorption material chamber, through which fuel vapor containing gas can flow;

an adsorption material filled within the adsorption material chamber; and an insert configured to be inserted into the adsorption material chamber, wherein the insert allows the adsorption material to be positioned on an outer circumferential side of the insert within the adsorption material chamber, so that fuel vapor containing gas can flow through the adsorption material positioned on the outer circumferential side of the insert;

wherein the insert has no adsorption material contained therein and is configured to prevent fuel vapor containing gas from flowing through a space occupied by the insert.

16. The fuel vapor processing apparatus as in claim 15, wherein:

the insert has a longitudinal axis extending along a direction of flow of fuel vapor containing gas and an outer circumferential surface about the longitudinal axis; and the adsorption material surrounds the entire outer circumferential surface of the insert member.

17. A fuel vapor processing apparatus comprising:

a case having an inner circumferential surface defining an adsorption material chamber, through which fuel vapor containing gas can flow;

an adsorption material filled within the adsorption material chamber; and an insert disposed at a downstream end of the adsorption material chamber and capable of determining an effective flow passage area of the adsorption material chamber without producing a non-filled region of the adsorption material, through which fuel vapor containing gas flows;

wherein the insert has an outer circumferential surface and an inner circumferential surface;

the inner circumferential surface defines an internal space, through which fuel vapor containing gas flows; and the adsorption material includes a first adsorption material contained in the internal space of the insert and a second adsorption material contained in a space defined between the inner circumferential surface of the case and the outer circumferential surface of the insert.

* * * * *